United States Patent [19]
Szafranski et al.

[11] Patent Number: 5,338,051
[45] Date of Patent: Aug. 16, 1994

[54] SLIDING APPARATUS, SUCH AS A SKI, AND AN ELEMENT ATTACHED THERETO

[75] Inventors: Pierre Szafranski, Pringy; Jean-Mary Cazaillon, Annecy, both of France

[73] Assignee: Salomon S.A., Annecy Cedex, France

[21] Appl. No.: 7,650

[22] Filed: Jan. 22, 1993

Related U.S. Application Data

[62] Division of Ser. No. 669,585, Mar. 14, 1991, abandoned.

[30] Foreign Application Priority Data

Mar. 26, 1990 [FR] France ................ 90 03824

[51] Int. Cl.⁵ ....................... A63C 5/04; A63C 11/26
[52] U.S. Cl. ................... 280/607; 280/610; 156/309.6; 264/248
[58] Field of Search .......... 280/607, 610; 264/168, 264/248, 249; 156/73.5, 73.6, 308.2, 308.4, 309.6

[56] References Cited

U.S. PATENT DOCUMENTS

| | | | |
|---|---|---|---|
| 3,458,380 | 7/1969 | Kipp | 156/309.6 |
| 3,807,746 | 4/1974 | Kofler | 156/308.2 |
| 3,917,300 | 11/1975 | Salomon | 280/11.35 R |
| 3,977,688 | 8/1976 | Imagawa | 280/633 |
| 4,058,421 | 11/1977 | Summo | 156/73.5 |
| 4,115,506 | 9/1978 | Shima | 264/250 |
| 4,118,051 | 10/1978 | Shima | 280/610 |
| 4,377,428 | 3/1983 | Toth | 156/309.6 |
| 4,911,462 | 3/1990 | Diard et al. | 280/610 X |
| 4,953,885 | 9/1990 | Comert et al. | 280/610 |
| 4,993,740 | 2/1991 | Recher et al. | 280/610 |
| 4,995,931 | 2/1991 | Duthie | 156/308.4 |
| 5,000,475 | 3/1991 | Gagneux et al. | 280/602 |
| 5,057,170 | 10/1991 | Legrand et al. | 156/73.5 |
| 5,173,226 | 12/1992 | Cazaillon et al. | 264/46.6 |
| 5,183,618 | 2/1993 | Pascal et al. | 264/257 |

FOREIGN PATENT DOCUMENTS

| | | | |
|---|---|---|---|
| 983543 | 2/1976 | Canada . | |
| 3805968 | 9/1988 | Fed. Rep. of Germany | 280/610 |
| 3818569 | 4/1989 | Fed. Rep. of Germany . | |
| 1282053 | 12/1962 | France | 280/610 |
| 2596286 | 10/1987 | France | 280/610 |
| 2606289 | 5/1988 | France | 280/610 |
| 2615406 | 11/1988 | France . | |
| 2620974 | 3/1989 | France | 280/610 |
| 2627700 | 9/1989 | France . | |
| 2627701 | 9/1989 | France | 280/610 |
| 68226 | 4/1929 | Sweden | 280/610 |
| 107469 | 5/1943 | Sweden | 280/610 |

OTHER PUBLICATIONS

I. Robinson, "Linear Vibration Welding of Non-Metallic Components", *Welding and Metal Fabrication*, vol. 57, No. 4, May 1989, pp. 152–154, Redhill, Surrey, Great Britain.

*Primary Examiner*—Brian L. Johnson
*Attorney, Agent, or Firm*—Sandler Greenblum & Bernstein

[57] ABSTRACT

A ski, such as an alpine ski, a cross-country ski, a jumping ski, a monoski or a snowboard, e.g., having attached thereto an element, such as a slide plate of a safety binding, with a layer of thermofusible material. The attachment of the element to the ski, such as the attachment of the binding plate to the upper surface of the ski, is accomplished, e.g., by vibrational welding, to provide a secure connection between the slide plate, e.g., and the ski, and to provide a connection that enables a superior flexion characteristic of the ski in the area of the slide plate, without the use of screws that penetrate the structure of the ski.

18 Claims, 2 Drawing Sheets

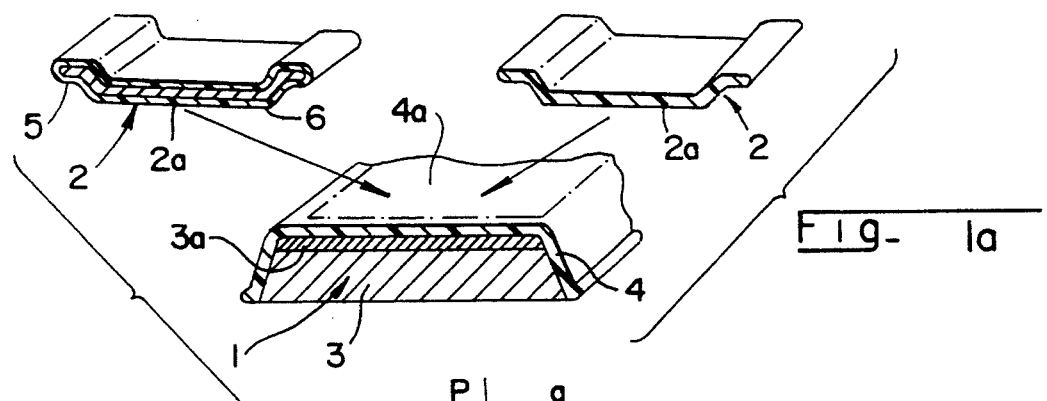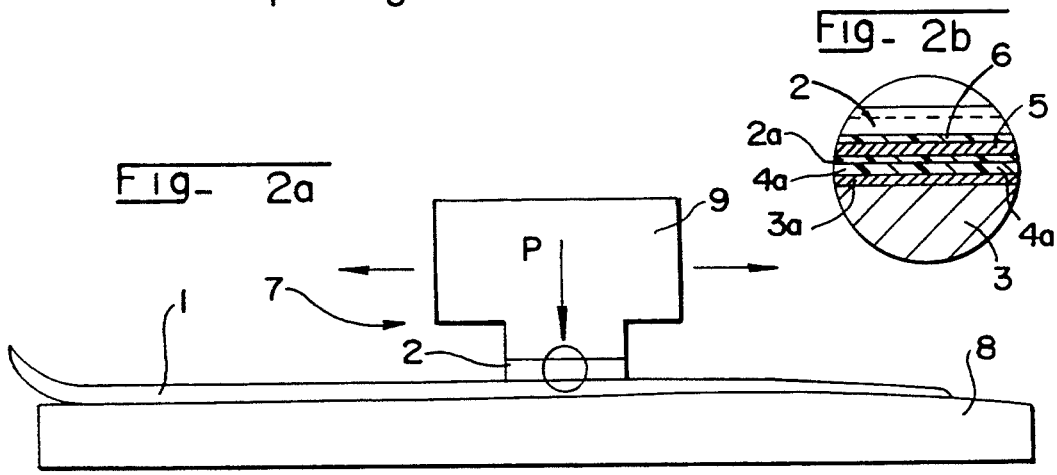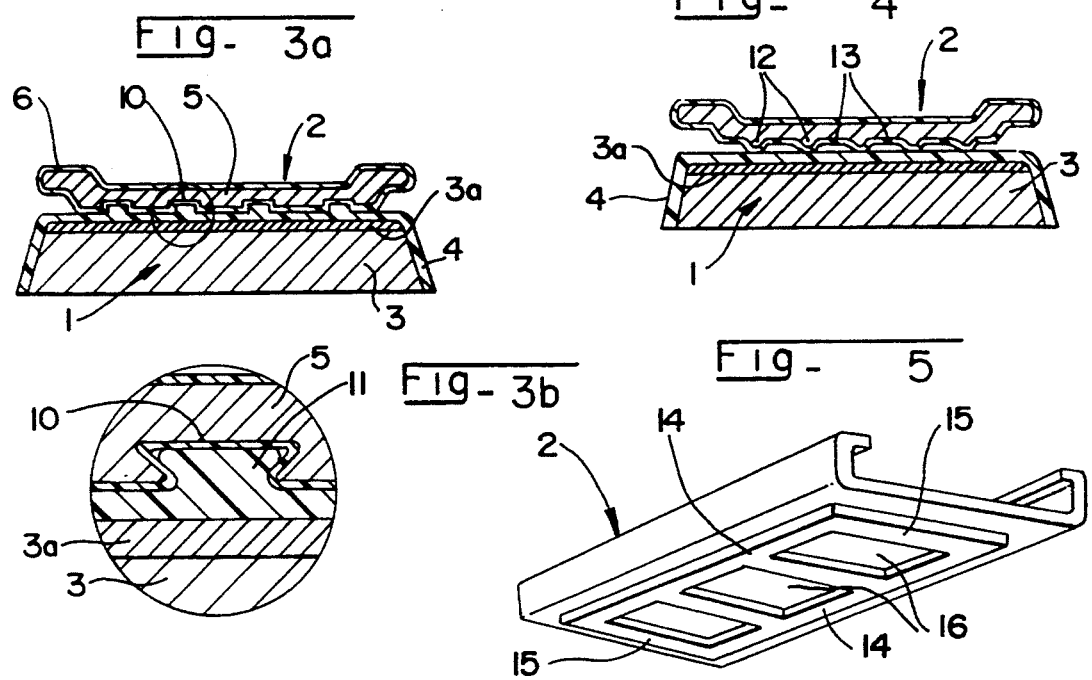

SLIDING APPARATUS, SUCH AS A SKI, AND AN ELEMENT ATTACHED THERETO

CROSS-REFERENCE TO RELATED APPLICATION

This is a division of application Ser. No. 07/669,585, filed on Mar. 14, 1991, now abandoned.

BACKGROUND OF THE INVENTION

1. Field of the Invention

The present invention relates to a process of assembling an applied element and a motive means for sliding on snow., as well as a motive means and an element applied adapted for performing this process.

2. Description of Background and Relevant Information

Motive sliding means on snow such as an alpine ski, a cross-country ski, a jumping ski, a mono ski, a snowboard, on etc. generally comprise a flat and elongated base element, for sliding on the snow, and at least one applied element affixed to the upper surface of the base element or to one of the ends of the ski. The applied element can be constituted by a portion of a safety binding, for maintaining a boot or shoe of a skier, a longitudinal slide on which is mounted the body of a binding, a stirrup or a maintenance carrier of a slide, a foot-rest plate, a heel element, a binding accessory such as an apparatus to avoid the crossing of the skis, a spatula or a spatula tip, a heel or heel protector, an anti-theft apparatus, etc.

Until the present these applied elements were affixed, on the upper surface of a sliding motive means, by means of a screw extending through holes bored in the applied element and screwed in the blind holes previously bored in the upper surface of the motive means. This process of assembly of an element applied on a sliding motive means has generally been adopted because it appeared as being the only way of ensuring the maximum safety of the skier by rendering impossible, in practice, an untimely separation between the applied element and the sliding motive means. However, such an assembly process has inherent disadvantages by virtue of the fact that it requires the preliminary boring of blind pre-holes in the upper surface the sliding motive means, by indicating the position of these pre-holes by means of a template, then the manual positioning of each screw in each hole of the applied element and its partial engagement in the corresponding pre-hole and, finally, the screwing of the different screws by utilizing a manual or electric screwdriver. It is thus obvious that such an assembly process of an element applied on a sliding motive means which requires several successive operations, requires a substantial handling, and the present invention attempts overcome this major inconvenience as further described below. On the other hand insertion of the screw has another disadvantage of weakening the ski structure.

SUMMARY OF THE INVENTION

To this end, an object of the present invention is to a process for assembling an applied element to a sliding motive means, such as a ski or similar device. More particularly, the process provides for a layer of thermofusible material to be placed on the respective attachment surfaces of the applied element and the motive slide means. The two layers of heat-meltable material in contact with one another are heated in a manner so as to bring them to a temperature above the melting point of the thermofusible material of each layer in contact, while applying under pressure the sliding motive means and the applied element against one another. Then the melted material is allowed to cool which, in hardening again, constitutes an adhesion layer between the sliding motive and the applied element.

Preferably, the heating of the thermofusible material is provided by subjecting the sliding motive means and the applied element to a relative vibrational movement which translates, in the contact zone between them, into a alternative friction, producing the progressive heating and the fusion of the thermofusible material.

For performing the process according to the invention, the surfaces in contact of the sliding motive means and the element applied must by nature be compatible, i.e., that the layers in contact must be able to be respectively positioned in fusion by alternating friction, under pressure, of the motive sliding means and the applied element against one another, and after fusion the two layers can be intimately mixed in a manner so as to form only a single homogeneous layer.

The motive sliding means and the applied element can each be formed in their entirety of a thermofusible material or further they can be constituted of any non-thermofusible material, this material being, however, covered with an outer layer made of thermofusible material in the attachment zone between the two of them.

The thermofusible materials on the attachment surfaces of the motive sliding means and the applied element can be of the same type or of different types, on the condition that, in this latter case, they be compatible.

A thermofusible material which has shown itself to be particularly appropriate for performing the process according to the invention is polyamide, preferably a polyamide 11 or 12 known under the name "RILSAN". However, other thermofusible materials can likewise be used and one can likewise utilize any polymer, reinforced or not, utilized currently for assembly of elements made out of plastic by the technique of vibrational welding. Likewise, two surfaces made of aluminum can adhere to one another by this process.

BRIEF DESCRIPTION OF THE DRAWINGS

The invention will now be described with reference to certain non-limiting examples of various embodiments of the present invention, with reference to the annexed drawings, in which:

FIGS. 1a and 1b are schematic perspective views, illustrating the different phases of the assembly process according to the invention;

FIG. 2a is a schematic side elevational view of a vibrational welding apparatus which can be utilized for performing the process according to the invention, applied to the assembly of a slide on the upper surface of a ski;

FIG. 2b is an enlarged view of a portion of FIG. 2a;

FIG. 3a is a vertical and transverse cross-sectional view of a ski carrying, on its upper surface, a slide assembled with the ski after performing the process according to the invention;

FIG. 3b is an enlarged view of a portion of FIG. 3a;

FIG. 4 is a vertical and transverse cross-sectional view of an alternative embodiment of a slide before its assembly with a ski;

FIG. 5 is a perspective view of the lower surface of a slide adapted to be assembled with a ski;

DESCRIPTION OF PREFERRED EMBODIMENTS

Figure 6:
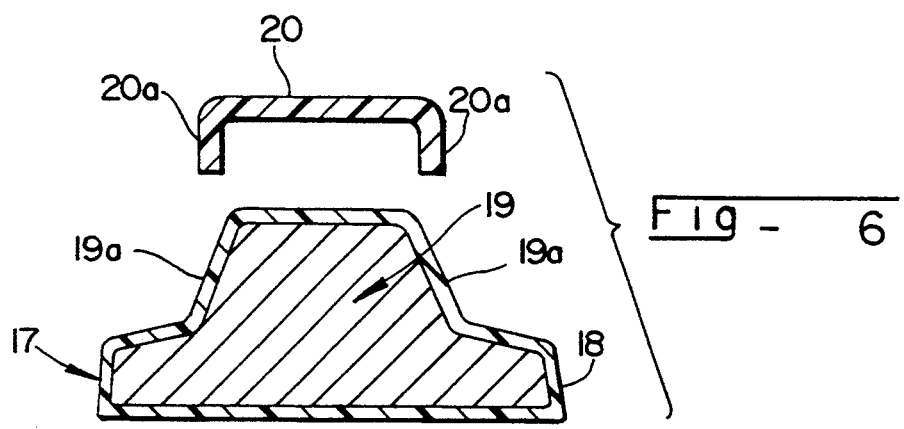
FIG. 6 is a vertical and transverse cross-sectional view of a cross-country ski having a central edge and an applied element adapted to be assembled with the ski, on its central edge.

FIG. 1a and 1b schematically illustrate the various operations leading to the assembly of a motive slide means on snow 1, in this case a ski, with an applied element 2 which is constituted, in this particular example, by a longitudinal slide of a safety binding. Ski 1 and slide 2 are adapted to permit the performance of the process according to the invention, in a manner so as to present, at least in the zone where their linkage must occur, layers of thermofusible material which come into contact with one another.

To this end, ski 1 comprises a core 3, constituted by a commonly utilized material, such as wood, metal, plastic material of the charged polyurethane type or not, of one or a plurality of reinforcement layers 3a, generally metallic made of aluminum, for example, or composed of glass fibers, carbon fibers, aramide fibers or others, impregnated with a thermohardening or thermoplastic material. This reinforcement layer 3a is itself covered with a layer 4 made of a thermofusible material. This layer 4 can coat the entire upper horizontal surface of ski 1, by constituting a linkage layer 4a, and lateral inclined surfaces, or only the upper surface at the location where they must be mounted to slide 2. Slide 2 can be formed, in its entirety, of a thermofusible material, then presenting a horizontal surface 2a constituting, itself, an attachment layer with the ski i, as is shown in the right portion of FIG. 1a. It can likewise be constituted by a composite element, such as shown in the left portion of FIG. 1a, by comprising in this case, an internal reinforcement 5 made of any appropriate material (metal plastic material, etc.) covered with an external coat 6. The lower horizontal layer of this coating 6 thus forms the attachment layer 2a, made of thermofusible material, intervening in the assembly process. This composite element, having reinforcement 5 and coating 6 of thermofusible material can be formed by a bi-injection technique, i.e., successive injections in a mold of two different materials which adhere by welding or gluing or, furthermore, by coextrusion, when it is a relatively simple element, planar for example. This can be also formed by overmolding of the envelope 6, of thermofusible material around reinforcement 5 made of a particular material. Tn the case of a coating applied to metallic elements, a known method of electrostatic projection or of soaking in a fluidized bath, for example, can be utilized.

To achieve the assembly of ski 1 and of slide 2, the slide is placed, in the appropriate longitudinal position, on the upper horizontal surfaces of ski 1 in a manner such that the two attachment layers 2a and 4a, made of thermofusible material are in contact with one another. Ski 1 and slide 2 are then applied under pressure against one another. In one preferred manner of performing the invention, a vibrational welding apparatus 7 of a known type can be utilized which is shown schematically in FIG. 2a. This welding apparatus 7 comprises a lower fixed plate 8 and an upper movable plate 9 which is subjected to vibrations by appropriate means not shown. For performing the process according to the invention by utilizing such an apparatus, one immobilizes the ski 1 on the lower fixed plate 8, by aligning it in the direction of vibration of the upper movable plate 9, and a vertical pressure P is exerted, from top to bottom on slide 2 placed previously in the appropriate longitudinal position on the ski 1. Then, while maintaining the pressure P, the upper movable plate 9 is vibrated longitudinally and, consequently, the slide 2 is caused to vibrate with respect to the lower immobilized ski 1. The longitudinal vibrational movement of the slide 2 on the ski 1 translates into an alternating friction of the thermofusible material layer 2a of the moveable slide 2 on the layer of thermofusible material 4a of the fixed ski 1. This alternating friction causes a progressive heating of the two layers 2a and 4a and the duration of the movement of the phase of longitudinal vibrational movement of the slide 2 is selected to be sufficient (on the order of several seconds) such that the temperature reached by the two layers of thermofusible material 2a and 4a is greater than their melting point. These two layers melt while they are intimately mixed, under the effect of pressure P, so as to form a homogeneous layer. This pressure P is maintained during a short period of time, on the order of several seconds, after cessation of the vibrational longitudinal movement, to allow for the cooling and the solidification of the homogeneous attachment layer which previously fused and to obtain a rigid and strong layer or weld between the ski 1 and the slide 2. By means of the present invention, therefore, a direct connection is made between the ski 1 and the slide 2 or other applied element.

Although it is preferable, in most cases, to cause the heating of the thermofusible material by alternating friction in the longitudinal direction of the motive sliding means 1, one can also obtain this result by producing the vibration, causing the friction, in the transverse direction.

Preferably, the layers of thermofusible material 2a and 4a, ensuring the linkage between the ski 1 and the slide 2, are of polyamide 11 or 12 which are known as "RILSAN". In effect, this material has the advantage of rapidly passing from the solid state into the liquid state, practically without an intermediate pasty state, and its melting point is precise. Furthermore, in the liquid state, it flows in a manner so as to fill any possible hollow spaces and consequently an evening out of the surfaces of the ski 1 and of the slide 2 is obtained.

By way of example, the process according to the invention has been performed with a ski 1 having an external "RILSAN" coating, and with a slide 2 having reinforcement 5 made of aluminum covered with a coating 6 of "RILSAN". This coating has been obtained by a known process of electrostatic projection, the thickness of the coating 6 of "RILSAN" and particularly the attachment layer 2a being approximately 150 micrometers. The coating 6 of "RILSAN" can also be obtained by soaking in a fluidized bath. The pressure P exerted during the alternating friction has been created by a vertical pressure force of 800 decaNewtons. Slide 2 has been subjected to a vibrational movement in the longitudinal direction of the ski, with an amplitude I 0.75 mm with a frequency of 240 Hz. for a duration of four seconds. Various tests have been performed by eliminating pressure P, immediately after the longitudinal vibrational movement phase, or by maintaining it still for a duration of up to five seconds after ending the vibrational movement. With this process a resistance to separation has been obtained, in the vertical direction, between the ski 1 and the slide 2 on the order of magnitude of that obtained with an assembly by means of screws.

The surface of the applied element 2 which comes into contact with ski 1 can be adapted in a manner so as to reinforce adherence. For example, as is shown in FIG. 3a, and 3b, the lower surface of slide 2 has longitudinal (and/or transverse) grooves 10 having a right cross-section in the form of a dovetail. As a result, during alternative friction, the thermofusible material of the two attachment layers 2a and 4a penetrates, after its fusion and under the effect of pressure, within grooves 10, which makes it possible to reabsorb the material in excess in fusion and, improve the attachment of slide 2 on ski 1 by the mechanical anchorage resulting from attachment ribs 11 constituted by the material having flowed and hardened in grooves 10.

According to one alternative, the lower surface of slide 2 can have ribs which project, as is shown in FIGS. 4 and 5. In FIG. 4 the lower surface of slide 2 has longitudinal (and/or transverse) ribs 12 defining between them hollow spaces 13. As a result, the friction and the welding are concentrated at the location of ribs 12 and the heat-meltable material in excess can flow into the hollows 13 positioned between the ribs 12.

FIG. 5 illustrates an alternative embodiment in which the lower surface of slide 2 has two longitudinal ribs 14, close to the longitudinal edges of slide 2, and which are connected by transverse ribs 15, by defining between them hollows 16 in which the thermofusible material can flow in fusion. The ribs can also be present in the upper surface of the ski.

FIG. 6 illustrates an application of the process according to the invention to a cross-country ski 17 comprising an internal core surrounded by an external envelope 18 constituted by a layer of thermofusible material such as "RILSAN". The cross-country ski 17 has, at its upper portion, a central longitudinal rib 19, adapted to be capped by an applied element 20 constituting a support element for a cross-country ski shoe. This support plate 20 is constituted in its entirety, of "RILSAN", as is shown in FIG. 6, or furthermore, it is formed by a composite element having an external coating of "RILSAN". The rib 19 of the cross-country ski 17 has a trapezoidal transverse cross-section, having lateral inclined surfaces 19a converging upwardly, and in the same manner the applied support plate 20 has a vertical transverse cross-section in the form of U or C open downwardly. The two lateral arms 20a of the applied support plate 20, which extend downwardly, are vertical or slightly converging in the upward direction. These two arms 20a are inclined with respect to one another by an angle which is less than the angle at which are inclined the two lateral surfaces 19a of rib 19 with respect to one another. As in the previously described example, during the performance of the assembly process, the upper support plate 20 is applied under pressure on rib 19 in a manner such that its lower lateral arms 20a are spaced towards the exterior by virtue of their relative inclination different from that of inclined lateral surfaces 19a of rib 19, so that they are strongly pressed against these latter surfaces 19a. To assure the assembly of the ski 17 and of the applied support plate 20, to produce the contact pressure, a vertical force of 600 decaNewtons has been exerted, with an amplitude of longitudinal vibrational movement ± 0.6 mm and with a duration of vibrational movement has been 3–4 seconds.

One can utilize, for performing the process according to the invention, layers of thermofusible materials which may or may not be charged. For example, the applied slide 2 can be formed of "RILSAN", filled with fibers. In this case one can utilize, for the applied slide 2, a percentage of fibers (for example, 15%) less than that (35% or more) which is currently utilized for the manufacture of assembled slides with a ski by means of screws. This substantial reduction in the percentage of fibers makes possible, during the welding operation by alternative friction, a better penetration of the melted "RILSAN" between the fibers and an excellent attachment of the slide 2 on ski 1. Thus an improvement in flexibility of the slide is likewise obtained, by virtue of a lowering of the proportion of fibers, and consequently a diminution of the constraints between the slide 2 and the 1, particularly during the flexional movements of the ski. In effect, in the case of a slide 2 secured by screws, any bias appearing between the slide 2 and the ski 1 converges towards the various attachment screws. On the contrary, in the case of the slide affixed by welding, the biases are distributed over the entire surface of contact between the slide 2 and the ski 1.

Figure 7:
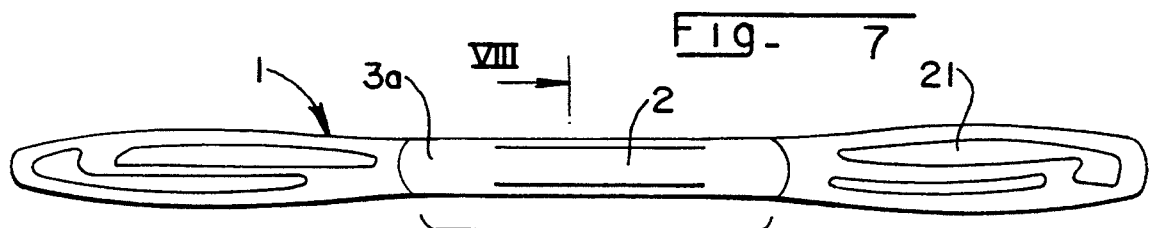
FIG. 7 is a plan view of a ski adapted for performing the assembly process according to the invention.

FIG. 7 illustrates an embodiment in which the decoration of the ski is carried by a layer of material 21 which is not compatible with vibrational welding. Illustrated in the embodiment, the layer of material 21 is present in front of the ski, at the rear of the ski, but not in the central zone 1a of the ski slide. In this zone 1a, the reinforcement 3a of the ski is directly accessible. Preferably, this reinforcement is made of a material compatible with the slide 2, for a vibrational welding. It is thus possible to apply and weld by vibration the slide 2 on the reinforcement 3a. This alternative is also applicable in the case where the reinforcement 3a is accessible directly from one end to the other of the ski.

Figure 8:
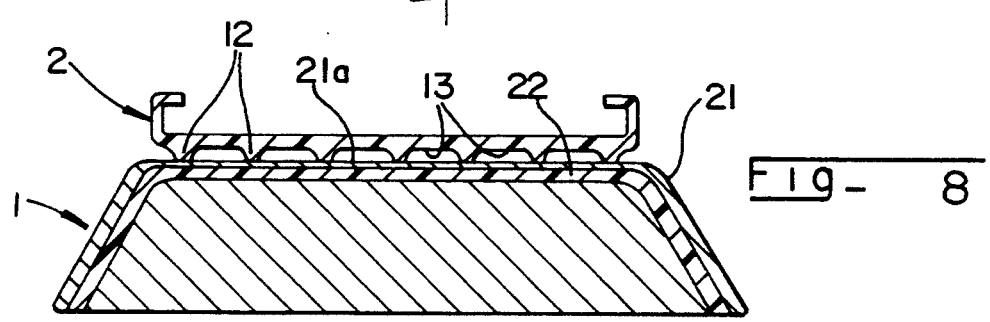
FIG. 8 is a vertical and transverse cross-sectional view, on a larger scale, taken along the line VIII—VIII of FIG. 7.

FIG. 8 illustrates a ski 1 whose coating 21, useful for decorating the ski, is not formed of a compatible material with vibrational welding. In this case, one forms the noncompatible coating 21 in a manner such that it is very thin in the zone where the assembly of the applied element 2 must be performed, i.e., the zone of the skating or sliding portion of the ski in the case of the affixation of the slide 2, and that it is present, at this location, in the form of a thin film 21a. Under this film 21a is found an insert 22 which is formed of any material compatible with the applied element 2 assembled by vibrational welding. In this case, the first portion of the frictional phase of the applied element 2 on the ski serves to destroy, at least locally, the superficial film 21a, in a manner such that the insert of compatible material 22 is then accessible. It is particularly advantageous that the applied element 2 (or the ski 1) has projecting ribs 12, as is shown, for example, in FIGS. 4 and 5, so as to locally concentrate the friction and to allow for the flow of the non-compatible material of the film 21a in the hollows 13 defined by the ribs.

Of course, the invention is not limited to the embodiments shown. By way of example, it is contemplated that the reinforcement layers 3a, forming the structure of the motive sliding means, have a charged thermoplastic matrix which is compatible with an applied element. In this case, the heat-meltable layer 4 can be dispensed with. The applied element is directly applied and welded by friction on the reinforcement 3a.

Figure 9:
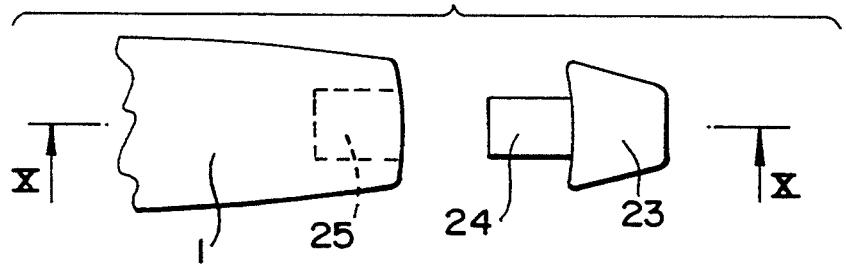
FIG. 9 is a plan view of the rear of a ski comprising an applied heel protector affixed by the process according to the invention.
Figure 10:
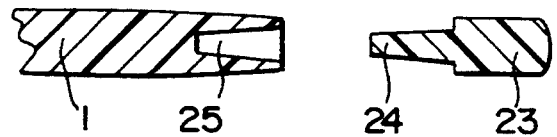
FIG. 10 is a vertical and longitudinal cross-sectional view along line X—X of FIG. 9.

FIGS. 9 and 10 illustrate another embodiment of the invention according to which the applied element is a heel protector, i.e., an element that the ski has at the location of the heel to protect it from shocks on the ground. The heel protector has a principal portion 23 which extends through a tenon 24, which tenon is adapted to engage in a seat 25 formed in the frontal rear zone of the ski and which is of a shade and a cross-section corresponding to that of the tenon 24. The internal surface of the seat 25 and the external surface of the tenon 24 are compatible with one another for vibrational welding.

Preferably, as is shown in FIG. 10, the tenon 24 and the seat 25, which are substantially bevelled are seen in cross-section through longitudinal and vertical planes. Furthermore, the bevelled edge of seat 25 preferably has, in these vertical and longitudinal planes, dimensions which are slightly less than those of tenon 24, such that a force exerted on the heel protector, in the longitudinal direction, causes a pinching of the tenon 24 in its seat 25. Furthermore, the width of the tenon 24 is substantially less than the width of seat 25, as is visible in FIG. 9.

The process has the following phases: the tenon 24 of the heel protector is engaged in seat 25, and adapted to move in a vibrational translational movement with respect to the ski. This movement is oriented in horizontal and transverse direction. A pressure force applies the heel protector against the ski in a longitudinal direction. After a predetermined duration sufficient to melt the contact surfaces, the vibration is stopped, the heel protector is then maintained with pressure against the rear of the ski in its final position. One can likewise orient the vibrations between the heel of the ski and the heel protector along a horizontal and longitudinal direction.

The instant application is based upon French patent publication No. 2,659,865, published on Sep. 27, 1991. the disclosure of which is hereby expressly incorporated by reference thereto, and the priority of which is hereby claimed.

Although the invention has been described with reference to particular means, materials and embodiments, it is to be understood that the invention is not limited to the particulars disclosed and extends to all equivalents within the scope of the claims.

What is claimed is:

1. An assembly comprising:
   a ski, said ski having an internal structure and an attachment zone, in combination with an attachable element, said attachable element being foreign to said internal structure of said ski and having an attachment zone, said attachable element being adapted to be assembled to said ski by connection of said attachment zone of said ski to said attachment zone of said attachable element, said attachment zone of said ski being a longitudinally extending portion of an upper surface of said ski subject to flexional stresses during use of said ski and said attachable element comprising means for transferring flexional stresses to and receiving flexional stresses from said attachment zone of said ski;
   said ski, at least in said attachment zone thereof, having a first quantity of thermofusible material and said attachable element, at least in said attachment zone thereof, having a second quantity of thermofusible material, said thermofusible material of said first quantity being compatible with said thermofusible material of said second quantity for forming a thermofusible weld and for thereby forming a direct connection between said ski and said attachable element.

2. An assembly according to claim 1, wherein:
   said attachable element is assembled on said ski and said first and second quantities of thermofusible material of said ski and said attachable element comprise an intimate intermixture at the respective attachment surfaces of said ski and said attachable element.

3. An assembly according to claim 1, wherein:
   said second quantity of thermofusible material of said attachable element comprises a coating on said attachable element.

4. An assembly according to claim 1, wherein:
   said attachable element is entirely comprised of said second quantity of thermofusible material.

5. An assembly according to claim 1, wherein:
   said thermofusible material of said first and second quantities of thermofusible material is a polyamide.

6. An assembly according to claim 1, further comprising:
   a coating of material covering said attachment zone of said ski, said coating of material being incompatible with said thermofusible material, said coating of material having a resistance such that said coating is destroyed during heat welding of said attachable element to said ski.

7. An assembly comprising:
   a ski, said ski having an internal structure and an attachment zone, in combination with an attachable element, said attachable element being foreign to said internal structure of said ski and having an attachment zone, said attachable element being adapted to be assembled to said ski by connection of said attachment zone of said ski to said attachment zone of said attachable element, said attachment zone of said ski being a portion of an upper surface of said ski and said attachable element being at least a portion of a binding for securing a ski boot upon said upper surface of said ski;
   said ski, at least in said attachment zone thereof, having a first quantity of thermofusible material and said attachable element, at last in said attachment zone thereof, having a second quantity of thermofusible material, said thermofusible material of said first quantity being compatible with said thermofusible material of said second quantity.

8. A ski comprising:
   a sliding apparatus, said sliding apparatus having an outer surface, an internal structure and a lower sliding surface for which the ski is enabled to slide over a surface, wherein said outer surface of said sliding apparatus comprises an attachment zone;
   an attachable element, said attachment zone comprising an upper surface of said outer surface of said sliding apparatus and said attachable element comprises at least a portion of a binding for affixing a ski boot to said ski; and only a single layer of thermofusible material between said sliding apparatus and said attachable element by which said sliding apparatus and said attachable element are connected at said attachment zone of said sliding apparatus, there being no mechanical fastening element extending from said attachable element penetrating said outer surface of said sliding apparatus.

9. A ski in accordance with claim 8, wherein:

said portion of a binding comprises a slide plate upon which an additional binding assembly is adapted to be slidably adjustably affixed.

10. A ski assembly comprising:

a ski having an outer surface, an internal structure and a lower sliding surface for which the ski is enabled to slide over a surface, wherein said outer surface of said ski comprises an attachment zone, said attachment zone being subject to flexional stresses during use of said ski, said ski comprising a thermofusible material at least at said attachment zone;

a binding element comprising a thermofusible material; and means for connecting said binding element to said ski at said attachment zone of said ski, said means for connecting consisting only of a portion of said thermofusible material of said ski and a portion of said thermofusible material of said binding element, thereby constituting a direct connection between said binding element and said ski.

11. An assembly according to claim 10, wherein:

said outer surface comprises an upper surface and said attachment zone of said ski is located at said upper surface.

12. A ski assembly comprising:

a ski having an outer surface, an internal structure and a lower sliding surface for which the ski is enabled to slide over a surface, wherein said outer surface of said ski comprises an attachment zone, said attachment zone being subject to flexional stresses during use of said ski, said ski comprising a thermofusible material at least at said attachment zone;

a binding element comprising a thermofusible material; and a weld of thermofusible material between said thermofusible material of said ski and said thermofusible material of said binding element, said binding element thereby being connected directly to said ski at said attachment zone of said ski, there being no mechanical fastening element extending from said binding element penetrating the outer surface of said ski.

13. A ski in accordance with claim 12 wherein:

said binding element has an attachment zone for attaching said binding element to the attachment zone of said ski; and said attachment zone of said ski and said attachment zone of said binding element comprise complementary mating grooves and ribs for providing mechanical anchorage.

14. A ski in accordance with claim 13, wherein:

said mating grooves and ribs being shaped in the form of at least one dovetail connection.

15. A ski in accordance with claim 12 wherein:

said binding element comprising alternating ribs and grooves; and said weld of thermofusible material is located within said grooves of said binding element.

16. A ski in accordance with claim 15, wherein:

said ski comprises alternating ribs and grooves, wherein said weld of thermofusible material is located within said grooves of said binding element and wherein said weld of thermofusible material is located within said grooves of said ski.

17. A ski in accordance with claim 12, wherein:

said binding element comprises a plurality of hollows; and said weld of thermofusible material is located within said plurality of hollows.

18. A ski in accordance with claim 12, wherein:

said ski comprises a width defined by a pair of opposite longitudinally extending side surfaces;

said ski comprises a longitudinally extending upwardly projecting rib, said rib having a width less than said width defined by said pair of opposite longitudinally extending side surfaces; and at least a portion of said attachment zone of said ski comprises an upper surface of said rib.

* * * * *